(12) United States Patent
Proano et al.

(10) Patent No.: US 8,160,109 B2
(45) Date of Patent: Apr. 17, 2012

(54) METHOD AND SYSTEM FOR SYNCHRONIZING A TRANSCEIVER AND A DOWNSTREAM DEVICE IN AN OPTICAL TRANSMISSION NETWORK

(75) Inventors: Jay Proano, Rancho Santa Margarita, CA (US); Sheila Oiu, Carlsbad, CA (US); Tim Chan, Diamond Bar, CA (US); Hongtao Jiang, Anaheim, CA (US)

(73) Assignee: Broadcom Corporation, Irvine, CA (US)

( * ) Notice: Subject to any disclaimer, the term of this patent is extended or adjusted under 35 U.S.C. 154(b) by 3320 days.

(21) Appl. No.: 10/330,416

(22) Filed: Dec. 27, 2002

(65) Prior Publication Data

US 2004/0086278 A1    May 6, 2004

Related U.S. Application Data

(60) Provisional application No. 60/423,071, filed on Nov. 1, 2002.

(51) Int. Cl.
*H04J 3/06* (2006.01)
(52) U.S. Cl. .......................... 370/503; 398/154
(58) Field of Classification Search ............ 370/503, 370/509; 398/154, 135
See application file for complete search history.

(56) References Cited

U.S. PATENT DOCUMENTS

| | | | | |
|---|---|---|---|---|
| 4,847,877 A * | 7/1989 | Besseyre | | 375/368 |
| 5,907,566 A * | 5/1999 | Benson et al. | | 714/798 |
| 6,466,572 B1 * | 10/2002 | Ethridge et al. | | 370/352 |
| 6,504,840 B1 * | 1/2003 | Bostrom et al. | | 370/360 |
| 6,654,383 B2 * | 11/2003 | Haymes et al. | | 370/466 |
| 7,075,953 B2 * | 7/2006 | Keller | | 370/539 |
| 7,173,930 B2 * | 2/2007 | Wellbaum et al. | | 370/356 |
| 2001/0014104 A1 * | 8/2001 | Bottorff et al. | | 370/471 |
| 2002/0080824 A1 * | 6/2002 | Wingrove | | 370/509 |
| 2004/0042498 A1 * | 3/2004 | Furuness et al. | | 370/503 |

OTHER PUBLICATIONS

Physical Coding Sublayer (PCS) and Physical Medium Attachment (PMA) sublayer, type 1000BASE-X, IEEE, 2000 Edition, Local and Metropolitan Area Networks, pp. 962-1008.

* cited by examiner

*Primary Examiner* — Brian Nguyen
(74) *Attorney, Agent, or Firm* — Thomas, Kayden, Horstemeyer & Risley LLP.

(57) ABSTRACT

Aspects of the invention provide a method and system for synchronizing a transceiver and a framer in an optical transmission network. Subsequent to achieving synchronization of an inbound data stream, an internal framer may be adapted to inform a downstream device such as a full framer, that synchronization has already been attained. Accordingly, the downstream device may not need to perform resynchronization of the inbound data and can immediately start processing the inbound data. Advantageously, the internal framer may provide expedited error checking, handling and reporting prior to receipt of the data by the downstream device.

18 Claims, 2 Drawing Sheets

METHOD AND SYSTEM FOR SYNCHRONIZING A TRANSCEIVER AND A DOWNSTREAM DEVICE IN AN OPTICAL TRANSMISSION NETWORK

CROSS-REFERENCE TO RELATED APPLICATIONS/INCORPORATION BY REFERENCE

This application makes reference to, claims priority to and claims the benefit of U.S. Provisional Patent Application Serial No. 60/423,071 filed on Nov. 1, 2002.

The above stated application is incorporated herein by reference in its entirety.

BACKGROUND OF THE INVENTION

Certain embodiments of the invention relate to communication of signals in optical transmission networks. More specifically, certain embodiments of the invention relate to a method and system for synchronizing a transceiver and a downstream device in an optical transmission system.

Synchronous optical network (SONET) and synchronous digital hierarchy (SDH) include a set of related standards that define synchronous data transmission over fiber optic transmission networks. SONET defines a United States (US) version of the standard which is published by the American National Standards Institute (ANSI). However, SDH defines the international version of the standard published by the International Telecommunications Union (ITU). Together, the SONET and SDH standards ensure interconnectivity and interoperability between local and international optical networks and also among conventional and legacy systems.

SONET has a nominal base transmission line rate of 51.84 Mbps, known as optical carrier level one (1) OC-1 or synchronous transport signal level one (1) or STS-1. SONET provides a set of multiples of the base rate known as OC-1, up to a current maximum line rate of 9.953 gigabits per second (Gbps). Notwithstanding, actual line rates in excess of 20 Gbps have be attained. The table below shows the various data rates for SONET and SDH as defined by their respective standards and specifications. Notwithstanding, other rates may be utilized to capitalize on technological advancements.

| Optical Level | Electrical Level | Line Rate (Mbps) | Payload Rate (Mbps) | Overhead Rate (Mbps) | SDH |
| --- | --- | --- | --- | --- | --- |
| OC-1 | STS-1 | 51.840 | 50.112 | 1.728 | STM-0 |
| OC-3 | STS-3 | 155.520 | 150.336 | 5.184 | STM-1 |
| OC-12 | STS-12 | 622.080 | 601.344 | 20.736 | STM-4 |
| OC-48 | STS-48 | 2488.320 | 2405.376 | 82.944 | STM-16 |
| OC-96 | STS-96 | 4976.640 | 4810.752 | 165.888 | STM-32 |
| OC-192 | STS-192 | 9953.280 | 9621.504 | 331.776 | STM-64 |
| OC-768 | STS-768 | 39813.120 | 38486.016 | 1327.104 | STM-256 |

The use of SONET in transport networks is fairly widespread and SONET is considered the foundation for the physical layer of broadband ISDN (BISDN). Transport protocols such as the well known asynchronous transfer mode (ATM) runs as a layer on top of SONET as well as other transport technologies. ATM utilizes a cell-based structure consisting of short fixed length packets called cells. These cells may be adapted to facilitate fast efficient packet switching and routing. Accordingly, a received payload may be multiplexed into these cells and quickly routed to its destination. This may be particularly useful in broadband networks that carry diverse content such as voice, video, data and images, some of which may include time critical data and subject to strict latency requirements and/or bandwidth constraints.

Transport networks using SONET and/or SDH may provide more powerful networking capabilities than existing asynchronous systems. Since synchronous transmission networks such as SONET and SDH utilize a highly stable reference clock signal, there is no need to locally align clock signals or provide clock synchronization in order to recover data. Accordingly, it is possible to recover much lower data rates such as digital system one (1) (DS-1), without having to demultiplex an entire bit stream, as would be required for conventional asynchronous transports networks.

SONET and/or SDH may also provide interconnectivity between various network vendor products by providing standardized physical layer interfaces. These standardized interfaces may define parameters such as an optical line rate, tolerable power levels, pulse width, light wave length, and various encoding and decoding algorithms. The standards also provide definitions for framing, including frame format and structure, data overheads and payload mapping. Information in the data overhead may facilitate various functions such as operations, administration, maintenance and provisioning (OAM&P).

While synchronous network systems are suitable for point-to-point communication application, SONET and SDH may be adapted to support point-to-point as well as point-to-multipoint arrangements such as hub configuration. In a hub configuration, for example, a hub may be configured to function as an intermediary for traffic which may be distributed to various network components or entities commonly referred to as spokes for the hub. In this regard, the hub may unify communication between network components and entities connected thereto, thereby eliminating inefficient communication between individual network components and entities. The hub may also reduce requirements for back-to-back multiplexing and help to realize the benefits of traffic grooming.

Traffic grooming may include tasks such as network traffic consolidation or segregation of network traffic which can provide more efficient usage of transmission facilities and bandwidth. The consolidation of traffic may include combining traffic from various locations or sources into one central transport facility. Segregation of network traffic received from various locations may include separating network traffic into its various constituent components and/or various logical and physical criteria. Some communication systems use techniques such as backhauling to reduce expenses associated with repeated multiplexing and demultiplexing. However, grooming may be used to eliminate inefficient methodologies such as backhauling. Although grooming may be done with asynchronous systems, it may require various expensive internal and infrastructure changes. However, synchronous networks such as SONET and SDH may be more conducive and adaptable to grooming since traffic data may be segregated at either an STS-1 level or a virtual tributary (VT) level and dispatched to various appropriate system components and/or entities for processing.

In SONET networks, for example, grooming may also provide segregation of services, which may include any one or more of voice, video, and data. For example, at an interconnection point, an incoming SONET line may contain different types of traffic such as switched, video, voice and/or data. In this case, a SONET network may be conveniently adapted to segregate the switched and non-switched traffic. SONET also includes various options that may be configured to facilitate integrated network OAM&P by providing connectivity between a single maintenance point and various network components or entities. In this regard, a single connection may be configured to reach all network elements within a given architecture, thereby eliminating a need for separate links which may be required for maintaining each and every network component or entity. Particularly, SONET provides overhead data that directly permits OAM&P activities such as remote provisioning. Remote provisioning may provide centralized maintenance and reduced maintenance cost. Since SONET provides substantial overhead information, this information may provide enhanced monitoring and maintenance, along with more efficient diagnostic capabilities which may significantly shorten downtime.

In digital transmission systems, clock signals are critical to system operation since they may be used to keep a constant bit rate and to demarcate the various logic levels in a data stream. Traditionally, transmission systems have been asynchronous with each network component providing its own local clock signal. Since the clocks are asynchronous, transitions of the signals do not necessarily occur at the same nominal rate and large variations may occur in the clock rate, resulting in variable bit rate data signals. In a synchronous system such as SONET, the average frequency of all the clocks in the system will be the same or very nearly the same. Accordingly, the frequency of the clocks will be synchronous or plesiochronous. Since every clock in the system can be traced back to a highly stable reference clock signal, a base rate or the STS-1 rate will remain at a nominal 51.84 Mbps allowing many synchronous STS-1 signals to be stacked together without any bit stuffing. Low speed synchronous virtual tributaries (VT) may also be interleaved to create much higher transmission data rates using SONET and SDH. At low speed, for example, DS-1's may be transported by synchronous VT's at a constant rate of approximately 1.728 Mbps.

Additionally, synchronous multiplexing may be done in multiple stages to achieve one of a plurality of desired data rate. Accordingly, a signal such as a synchronous DS-1 may be multiplexed and additional bits such as dummy bits may be added to account for variations which may occur in each individual data stream. Each individual DS-1 data stream may be combined with each other to form a DS-2 stream. This process may be repeated and each individual DS-1 data stream may be further combined with each other to form a DS-3 stream.

Notwithstanding the advantages provided by SONET and SDH, synchronization of information during various stages of processing and transport may affect the performance of SONET and SDH optical transmission systems. For example, when processing inbound data streams such as OC-3/OC-12/OC-48 formatted data streams intended for use by off-chip or downstream devices requiring, for example STS-48 signaling, the off-chip device may be required to resynchronize any received data stream in order to regenerate signals in its inbound data stream. However, any additional time required for re-synchronizing data signals in the inbound data stream my increase processing time which may, for example, result in increased delay and/or signal latency. Accordingly, more efficient methods for re-synchronizing and regenerating signals in a data steam may be required.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide synchronization of a transceiver with a downstream device in an optical transmission network. A method for frame-synchronizing a transceiver with a downstream device in an optical transmission network may include acquiring frame-synchronization with an inbound data stream by an internal framer of the transceiver. The downstream device may subsequently be notified of the acquired synchronization of the inbound data stream. The downstream device may receive the inbound data stream and begin processing the inbound data stream without having to synchronize to the inbound data stream.

The step of acquiring synchronization may further include the step of locating a first frame within the inbound data stream containing a first synchronization pattern. A second consecutive frame within the inbound data stream may also be located. In locating the second frame, only a portion of the synchronization pattern of the second frame may be used to locate the second consecutive synchronization frame. The notifying step may further include the step of communicating a signal via a conduit coupling the internal framer to the downstream device. The conduit may be an electrical or an optical conduit. The downstream device may be a full framer. The inbound data stream may be compatible with SONET, fibre channel and/or 10 gigabit Ethernet protocols.

In another embodiment of the invention, a machine-readable storage, having stored thereon a computer program having a plurality of code sections for synchronizing a transceiver with a downstream device in an optical transmission network, the code sections executable by a machine for causing the machine to perform the steps as described above, is provided.

Another aspect of the invention provides a system for synchronizing a transceiver with a downstream device in an optical transmission network. The system may include a synchronizer for acquiring synchronization with an inbound data stream. A notifier may be adapted to notify the downstream device of the acquisition of synchronization of the inbound data stream. A receiver may be adapted to receive the inbound data stream for processing without frame-synchronizing to the inbound data stream.

The synchronizer may further include at least one locator for locating a first frame in the inbound data stream containing a first synchronization pattern. The at least one locator may be configured to locate a second frame within the inbound data stream. The second frame may be consecutive to the first located frame. Furthermore, at least a portion of the synchronization pattern of the second frame may be used to locate the second synchronization frame. A conduit may be used to couple the internal framer to the downstream device and the conduit may be adapted to communicate a signal from the internal framer to the downstream device, informing the downstream device that synchronization has already been achieved. The conduit may be an electrical conduit or an optical conduit. The downstream device may be a full framer. The inbound data stream may be formatted in accordance with a SONET, fibre channel and/or 10 gigabit Ethernet protocol.

These and other advantages, aspects and novel features of the present invention, as well as details of an illustrated embodiment thereof, will be more fully understood from the following description and drawings.

DETAILED DESCRIPTION OF THE INVENTION

Aspects of the invention provide a method and system for synchronizing a transceiver and a framer in an optical transmission network. Subsequent to achieving synchronization of an inbound data stream, an internal framer may be adapted to inform a downstream device such as a full framer, that synchronization has already been attained. Accordingly, the downstream device may not need to perform frame-resynchronization of the inbound data and can immediately start processing the inbound data. Advantageously, the internal framer may provide expedited error checking, handling and reporting prior to receipt of the data by the downstream device.

Figure 1:
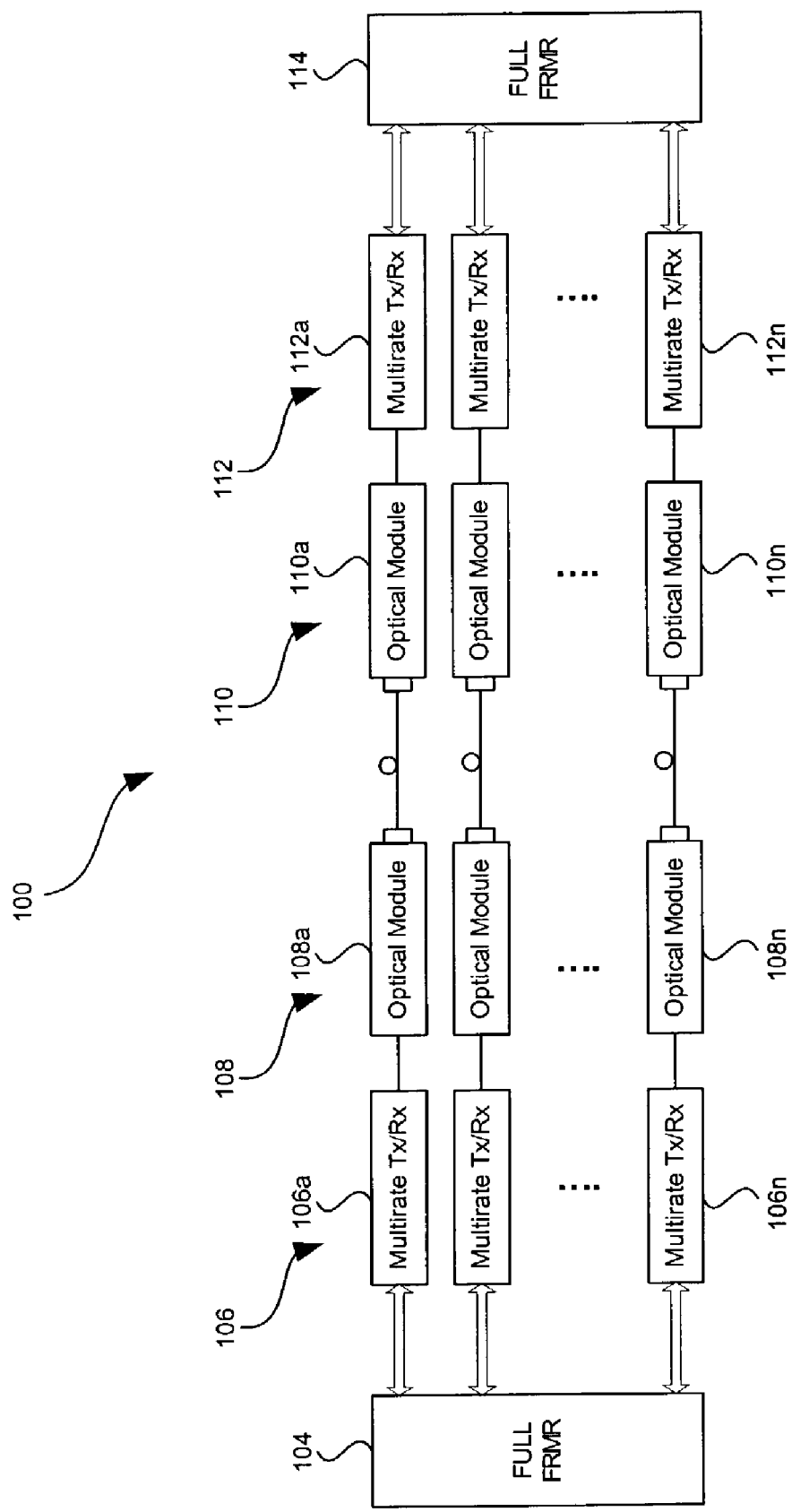
FIG. 1 is a functional block diagram of an exemplary system for synchronizing a transceiver and a framer in an optical transmission network in accordance with an embodiment of the invention

FIG. 1 is a functional block diagram 100 of an exemplary system for synchronizing a transceiver and a framer in an optical transmission network in accordance with an embodiment of the invention. Referring to FIG. 1, there is shown a first full framer 104, a second full framer 114, a plurality of multiple rate transceivers 106a . . . 106n collectively referenced as 106, a plurality of multiple rate transceivers 112a . . . 112n collectively referenced as 112, and a plurality of optical modules 108a . . . 108n collectively referenced as 108. The full framers 104, 114, multiple rate transceivers 106, 112, optical modules 108, 110, may be coupled as part of a SONET, SDH, Fibre Channel and/or Gigabit Ethernet communication system. In one embodiment of the invention, each one of the multiple rate transceivers 106, 112 may be adapted to recover serial clock and data from an inbound communication signal and provide synchronization and rudimentary function such as loss-of-signal (LOS) detection, out-of-frame detection (OOF), loss-of-frame detection (LOF), and performance monitoring.

Figure 2:
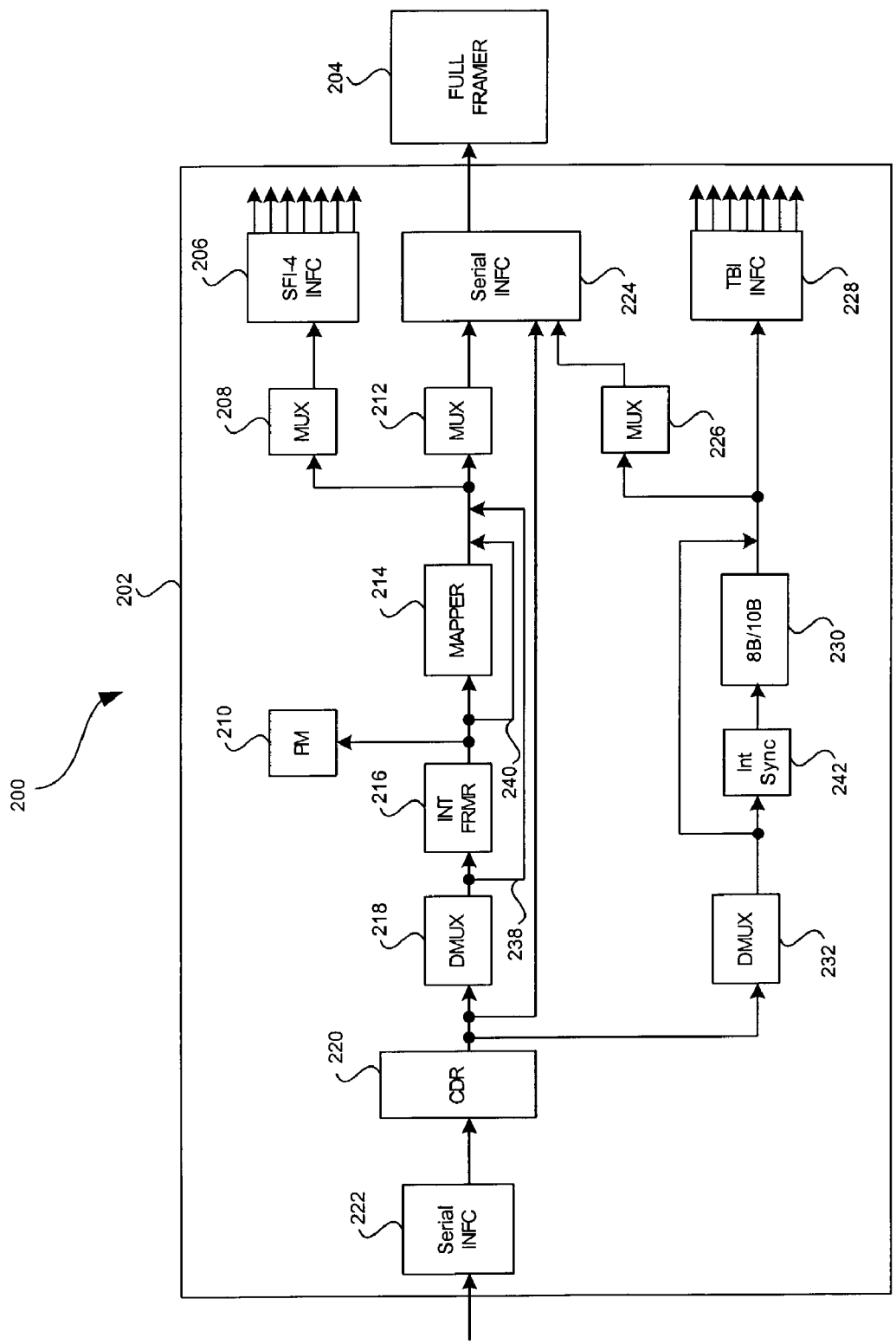
FIG. 2 is a block diagram of an inbound side of an exemplary multiple rate transceiver of FIG. 1 in accordance with an embodiment of the invention.

FIG. 2 is a block diagram 200 of an inbound side of an exemplary multiple rate transceiver 202 of FIG. 1 in accordance with an embodiment of the invention. Referring to FIG. 2, the multiple rate transceiver 202 may include serial interface block 222, clock and data recovery (CDR) block 220, demultiplexers (DMUXs) 218, 232, an internal framer (INT FRMR) 216, protocol performance monitoring block (PM) 210, a mapper 214, multiplexers (MUXs) 212, 208, 226, serial/deserializer interface (SFI-4) block 206, internal synchronizer (Int Synch) block 242, 8-bit/10-bit (8B/10B) decoder/encoder block 230 and a ten bit (10-bit) interface block 228.

The multiple rate transceiver 202 may be coupled to full framer 204 which may be located externally to the multiple rate transceiver 202. The multiple rate transceiver 202 may include the following components: serial interface block 222, clock and data recovery (CDR) block 220, demultiplexers (DMUXs) 218, 232, internal framer (INT FRMR) 216, protocol performance monitoring block (PM) 210, mapper 214, multiplexers (MUXs) 212,108, 226, serial/deserializer interface (SFI-4) block 206, and ten bit (10-bit) interface block (TBI) interface block 228. These components may be integrated into an integrated circuit (IC). In this regard, various pins, whether general purpose or specialized, may be coupled to one or more of the serial interface block 222, clock and data recovery (CDR) block 220, demultiplexers (DMUXs) 218, 232, internal framer (INT FRMR) 216, protocol performance monitoring block (PM) 210, mapper 214, multiplexers (MUXs) 212, 208, 226, serial/deserializer interface (SFI-4) block 206, and ten bit (10-bit) interface block 228 and brought to the surface of the multiple rate transceiver IC.

The CDR 220 may be adapted to receive an inbound serial data steam from the serial interface 222 and recover a serial clock from this inbound data stream. The recovered serial clock may be used to recover data from the inbound data stream. Accordingly, the CDR 220 may include appropriate logic and circuitry that may be adapted to generate a clock signal having, for example, the same frequency as the inbound data bit rate. In this regard, CDR 220 may phase-align inbound data by sampling the data in the center of its data eye pattern. The CDR 222 may be adapted to bit align the received data as part of the data recovery process.

The DMUX 218 may be adapted to receive the bit aligned data which may be in a serial format. Upon receipt of the serial bit aligned data, the DMUX 218 may demultiplex the serialized data into a plurality of parallel data streams to decrease a data rate of the received inbound serialized data stream.

The internal framer (INT FRMR) 216 may be adapted to locate at least a portion of the inbound data stream for each frame containing synchronization data. The synchronization data may be used to demarcate a beginning or start of a valid frame. The internal framer (INT FRMR) 216 may provide scrambling/descrambling of the demultiplexed serialized data, data communication channel bytes D1, D2, and D3 insertion and extraction, J0, Z0 bytes processing including, insertion and extraction, and B1 performance monitoring. An OC-3/OC-12/OC-48 receiver interface may be integrated into the internal framer (INT FRMR) 216 and configured to provide an OC-3/OC-12/OC-48 mapping function, B1 error detection, standardized framing and descrambling.

The mapping function may be configured, for example, to map OC-3/OC-12/OC-48 into an STS-48 formatted signal. J0 and Z0 bytes may be optionally a part of the overhead and may be used to carry, for example section trace messages. For example, J0 bytes used to carry section information may be stored in a message buffer by, for example, a trace processor or host microprocessor in a 16-byte or 64-byte format. Accordingly, information stored in the message buffer may be read out of the message buffer and inserted into the J0 byte. The J0 byte may be configured to operate in either a pass through or insertion mode. In the pass through mode of operation, the J0 byte may be adapted to remain untouched, while in the insertion mode, trace information may be read from the message buffer and inserted into the J0 byte. The Z0 byte may be configured to operate in one of a plurality of modes. For example, the Z0 byte may be set to a binary number corresponding to its order of appearance in for example, an STS-48 frame. The Z0 byte may also be set to a user programmer constant byte.

The internal framer (INT FRMR) 216 may be configured to selectively modify a section overhead of a frame without changing a signaling rate on an incoming or inbound data stream. Accordingly, upon receipt and detection of a frame, the internal framer (INT FRMR) 216 may also be adapted to determine the validity of a frame in order to ensure that realignment may be achieved by for example, the full framer 204. This information may be relayed to the full framer 114.

The Int Sync block 242 may be adapted to acquire frame-edge bit-alignment and to attempt to gain synchronization by searching the inbound data stream for a synchronization pattern, for example, a special COMMA code group.

The 8B/10B decoder/encoder block 230 may be adapted to perform error checking and handling. In this regard, the 8B/10B decoder/encoder block 230 may receive an 10-bit formatted inbound data stream at a frequency of, for example, 125 MHz. Upon achieving synchronization by the Int Sync block 242, the 8B/10B decoder/encoder block 230 may validate code groups and perform disparity checks. The 8B/10B decoder/encoder block 230 may include one or more counters that may be utilized for collecting and storing invalid code groups and running disparity errors. Subsequently, the 8B/10B decoder/encoder block 230 may encode 8-bit formatted data into 10-bit formatted data.

The TBI interface block 228 provides compatibility with devices that have been manufactured by a plurality of different vendors. In general, TBI interface block 228 may be adapted to interconnect a PCS sublayer and a PMD sublayer of a physical layer (PHY) device. The TBI interface block 228 may be adapted to receive 10-bit formatted data and convert the 10-bit formatted data into other formats suitable for use by, for example, other PHY devices.

In operation, CDR 220 may receive an inbound serial formatted data stream from the serial interface 222. CDR 220 may recover a clock and data signals from the received data. The recovered data signals, which may be serially formatted, may be demultiplexed by DMUX 218. In this regard, the DMUX 218 may transform serially received data into a plurality of parallel data streams. The internal framer (INT FRMR) 216 may receive the parallel data streams and may execute a frame search in order to acquire synchronization. During frame search, the internal framer (INT FRMR) 216 may execute a search for a frame demarcation along, for example, bit boundaries of inbound 16-bit formatted data. In this regard, the internal framer (INT FRMR) 216 may be adapted to search for, for example, a 32-bit pattern 0xF6F62828 delineating the synchronization and start of a SONET frame. Other protocols may utilize other synchronization patterns and the internal framer (INT FRMR) may be configured to search for those synchronization patterns.

In accordance with an embodiment of the invention, the internal framer (INT FRMR) 216 may be adapted to locate two consecutive synchronization patterns indicating the start of two consecutive frames. In the case of a SONET frame, the internal framer (INT FRMR) 216 may be adapted to locate two consecutive 0xF6F62828 patterns indicating the start of two consecutive frames, before it will report the identification of a valid frame.

Once the internal framer (INT FRMR) 216 detects a synchronization frame, it may continue to monitor the inbound stream for framing errors by, for example, executing a 12-bit check on the aligned output data. If, for example, four (4) consecutive frames contain one or more frame bit errors, the out of frame condition may be declared and a new frame synchronization search may be initiated. One or more bits in a register associated with the internal framer (INT FRMR) 216 and/or the multiple rate transceiver 202 may be adapted to report an out of frame condition. The register may be internal to the internal framer (INT FRMR) 216 or externally coupled thereto. Additionally, an interrupt signal may be generated to indicate an out of frame condition.

In accordance with an embodiment of the invention, an out of frame (OOF) condition may be declared if the internal framer (INT FRMR) 216 is not able to locate two consecutive frames within a specified time interval of about 250 µs, for example. One or more bits in an internal register of the internal framer (INT FRMR) 216 and/or the multiple rate transceiver 202 may be adapted to indicate the out of frame condition. In an alternative embodiment of the invention, at least a portion of the synchronization pattern may be used to detect the second of two consecutive frames. Hence, in the case of SONET where the synchronization frame consists of 32 bits, 24 bits of the synchronization pattern may be used to determine the second of two consecutive frames.

The internal framer (INT FRMR) 216 may be adapted to determine and report any loss of signal (LOS) detected by the multiple rate transceiver 202. The internal framer (INT FRMR) 216 may include a loss of signal detection block that may be adapted to monitor the scrambled data of the inbound data stream for the absence of logic ones (1s). If, for example, a 20 µs interval or other appropriate time interval of consecutive logic zero (0) is detected, a LOS condition may be declared. However, the interval is not limited to 20 µs, and other intervals may be utilized without departing from the spirit of the invention. One or more bits in an internal register associated with the internal framer (INT FRMR) 216 and/or the multiple rate transceiver 202 may be adapted to indicate the loss of signal condition. The register may be internal to the internal framer (INT FRMR) 216 or externally coupled thereto. Once the internal framer (INT FRMR) 216 identifies a first synchronization pattern, the framer may align its internal frame counter and align the output data on, for example, byte boundaries of the inbound data stream. If a valid synchronization pattern is located exactly one frame after the prior detected frame, the out of frame condition may be released.

In an embodiment of the invention, after acquiring synchronization, the internal framer (INT FRMR) 216 may notify or inform a downstream device such as full framer 204 that it has attained synchronization. In this regard, the internal framer (INT FRMR) 216 may include one or more external pins and/or registers that may be utilized to notify or inform the downstream device that synchronization has been achieved. In a case where the internal framer (INT FRMR) 216 utilizes an external pin to notify or inform the downstream device, the downstream device may be coupled to the external pin of the internal framer (INT FRMR) 216. An electrical or optical conduit may be used to couple the downstream device to internal framer (INT FRMR) 216. Hence, whenever the internal framer (INT FRMR) 216 achieves synchronization, it may, for example, assert a signal on its external pin and the asserted signal may be transferred via the electrical or optical conduit and detected by the downstream device. Once the internal framer notifies the downstream device such as the full framer that synchronization has been achieved, the downstream device does not need to resynchronize to the inbound data stream. Upon receipt of inbound data by the full framer, since no synchronization may be necessary, the full framer may immediately start processing any inbound data it receives. Accordingly, this may significantly decrease processing time.

The mapper 214 may be configured to receive, for example, OC-3/OC-12/OC-48 inbound data from the internal framer (INT FRMR) 216 and map this inbound received data into, for example, a 16-bit wide 155-MHz interface. The inbound data received from the internal framer (INT FRMR) may be formatted as 16-bit wide data to create an STS-48 formatted frame. The mapper 214 may generate a frame count for the newly mapped STS-48 formatted frame. The generated frame count may be phased to the OC-3/OC-12/OC-48 frame and stored within one or more registers or buffers, from which it may subsequently be extracted and inserted into appropriate time slots in the STS-48 frame. The mapper 214 may include one or more STS-48 counters and/or mapping functions that may be required to create an STS-48 frame. In this regard, the STS-48 counters may receive one or more marks from internal framer 216 and use these marks to phase the STS-48 frame so that data stored in one or more registers may be inserted into the proper time slots of the STS-48 frame.

Functions of mapper 214 may be bypassed via connection 240. In this regard, one or more register associated with the multiple rate transceiver 202 may be configured to select a pass-through mode or a bypass mode of operation for the mapper 214. In bypass mode, for example, inbound OC-3/OC-12/OC-48 signals are not mapped by the mapper 214. However in the pass-through mode of operation, inbound OC-3/OC-12/OC-48 signals may be mapped to, for example, STS-48 signal by the mapper 214. Combined functions of the internal framer (INT FRMR) 216 and the mapper 214 may be bypassed via connection 238. In this regard, one or more register associated with the multiple rate transceiver 202 may be configured to select a pass-through mode or a bypass mode of operation for the combined functions of the internal framer (INT FRMR) 216 and the mapper 214. Combined functions of the internal framer (INT FRMR) 216, the mapper 214 and DEMUX 218 may be bypassed via connection 236. In this regard, one or more registers associated with the multiple rate transceiver 202 may be configured to select a pass-through mode or a bypass mode of operation for the combined functions of the internal framer (INT FRMR) 216, the mapper 214 and the DMUX 218.

In one aspect of the invention, the functions of the internal framer may be a subset of the full framer. For illustrative purposes, a communication path including serial interface block 222, clock and data recovery (CDR) block 220, demultiplexer (DMUX) 218, internal framer (INT FRMR) 216, mapper 214, multiplexer (MUX) 212 and serial interface 224 may be a first outbound processing path. A communication path which may include serial interface block 222, clock and data recovery (CDR) block 220, demultiplexer (DMUX) 218, internal framer (INT FRMR) 216, mapper 214, multiplexer (MUX) 208 and serializer/deserializer (SERDES) interface (SFI-4) may be a second outbound processing path. The output of the serializer/deserializer (SERDES) interface (SFI-4) 206 comprising the first outbound communication path may be coupled to the full framer 204. In one aspect of the invention, the serializer/deserializer (SERDES) interface (SFI-4) 206 may be coupled to one or more of a plurality of slower speed devices. Accordingly, the serializer/deserializer (SERDES) interface (SFI-4) 206 may be configured to receive a single high speed serial data stream from the mapper 214 and deserialize the serial data stream into at least two or more parallel data streams having decreased data rates. These parallel data streams having slower data rates may be utilized by the slower speed devices. Advantageously, this may facilitate interconnectivity with slower speed devices.

The multiple rate transceiver 202 may also include a third communication path comprising serial interface 222, CDR 220, DMUX 232, 8B/10B decoder/encoder block 230, ten bit (10-bit) interface block (TBI) 228. This third communication path may not be critical to the practice of the invention. Notwithstanding, the output from the CDR 220 may be coupled to input of the DMUX 232. In this regard, the DEMUX 232 may be adapted to receive bit aligned data, which may be in a serial format, from the CDR 220. Upon receipt of the serial bit aligned data, the DMUX 232 may demultiplex the serialized data into a plurality of parallel data streams in order to decrease a data rate of the received inbound serialized data stream. The parallel output data streams from the DMUX 232 may be coupled to the 8B/10B decoder/encoder 230.

The 8B/10B decoder/encoder block 230 may be configured to perform error checks, which may include, but are not limited to, illegal code checks, disparity checks and invalid code checks. For example, there may be cases where both an illegal code and a running disparity error may cause an invalid code. In this case, an invalid code counter, which may be maintained for performance monitoring, may be incremented. The invalid code counter may be cleared upon a read access or other suitable method. The 8B/10B decoder/encoder block 230 may also be configured to handle certain decoding tasks within the multiple rate transceiver 202. A difference between the number of 1's and 0's in a block of data may be characterized as a running disparity (RD). A RD may be regarded as being positive when there are more ones (1s) than zeros (0s) and negative when there are more zeros (0s) than ones (1s). In an exemplary encoding scheme, each encoded 10-bit word may be assigned a RD of 0, +2, or −2, in order to ensure a high bit transition density for reliable clock recovery. Additionally, the RD encoding may be alternated for DC balancing. The balancing may be achieved by maintaining an equal number of ones (1s) and zeros (0s). Upon receipt of an invalid code, a decoder/encoder may replace the invalid code with an error code (/E/) K30.7, and may increment the invalid code counter. Upon receipt of a legitimate error code, /E/, the 8B/10B decoder/encoder block 230 may pass the error to an error handler (not shown) coupled to the 8B/10B decoder/encoder without incrementing the invalid counter.

Functions of the 8B/10B decoder/encoder block 230 may be bypassed via connection 234. In this regard, one or more register associated with the multiple rate transceiver 202 may be configured to select a pass-through mode or a bypass mode of operation for the 8B/10B decoder/encoder block 230. The output of the 8B/10B decoder/encoder block 230 may be coupled to the TBI interface 228. The output of the 8B/10B decoder/encoder block 230 may also be coupled to multiplexer 226. The multiplexer 226 may be adapted to receive a plurality of parallel data streams fram the 8B/10B decoder/encoder block 230 and serialize the received plurality of parallel data streams. The output of the multiplexer 226 may be coupled to the serial interface 224 of the first communication.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for synchronizing a transceiver with a downstream device in an optical transmission network, the method comprising:
    acquiring synchronization with an inbound data stream by a framer that is internal to said transceiver;
    notifying the downstream device of said acquired synchronization of said inbound data stream; and
    receiving said inbound data stream by the downstream device for processing without synchronizing to said inbound data stream.

2. The method according to claim 1, wherein said acquiring synchronization comprises:
    locating a first frame within said inbound data stream containing a first synchronization pattern; and
    locating a second frame having a synchronization pattern within said inbound data stream, said second frame being consecutive to said first located frame and only a portion of said synchronization pattern of said second frame is used to locate said second frame.

3. The method according to claim 1, wherein said notifying comprises: communicating a signal via a conduit coupling said internal framer to the downstream device.

4. The method according to claim 3, wherein said conduit is one of an electrical conduit or an optical conduit.

5. The method according to claim 1, wherein said downstream device is a full framer.

6. The method according to claim 1, wherein said inbound data stream is formatted in accordance with a protocol selected from the group consisting of: SONET, fibre channel and 10 Gigabit Ethernet.

7. A computer-readable medium, having stored thereon a computer program having at least one code section for synchronizing a transceiver with a downstream device in an optical transmission network, the code sections executable by a processor for causing the processor to perform the steps comprising:
    acquiring synchronization with an inbound data stream by a framer that is internal to said transceiver;
    notifying the downstream device of said acquired synchronization of said inbound data stream; and
    receiving said inbound data stream by the downstream device for processing without synchronizing to said inbound data stream.

8. The computer-readable medium according to claim 7, wherein said acquiring synchronization comprises:
    locating a first frame within said inbound data stream containing a first synchronization pattern; and
    locating a second frame having a synchronization pattern within said inbound data stream, said second frame being consecutive to said first located frame and only a portion of said synchronization pattern of said second frame is used to locate said second frame.

9. The computer-readable medium according to claim 8, wherein said notifying comprises: at least one code section for communicating a signal via a conduit coupling said internal framer to the downstream device.

10. The computer-readable medium according to claim 9, wherein said conduit is one of an electrical conduit or an optical conduit.

11. The computer-readable medium according to claim 7, wherein said downstream device is a full framer.

12. The computer-readable medium according to claim 7, wherein said inbound data stream is formatted in accordance with a protocol selected from the group consisting of: SONET, fibre channel and 10 Gigabit Ethernet.

13. A system for synchronizing a transceiver with a downstream device in an optical transmission network, the system comprising:
    a synchronizer for acquiring synchronization with an inbound data stream, said synchronizer comprising a framer that is internal to said transceiver;
    a notifier for notifying the downstream device of said acquired synchronization of said inbound data stream; and
    a receiver for receiving said inbound data stream by the downstream device for processing without synchronizing to said inbound data stream.

14. The system according to claim 13, wherein said synchronizer comprises:
    at least one locator for locating a first frame within said inbound data stream containing a first synchronization pattern; and
    said at least one locator locating a second frame having a synchronization pattern within said inbound data stream, said second frame being consecutive to said first located frame and only a portion of said synchronization pattern of said second frame is used to locate said second frame.

15. The system according to claim 13, wherein said notifier comprises: a conduit coupling said internal framer to the downstream device, said conduit communicating a signal from said internal framer to the downstream device.

16. The system according to claim 15, wherein said conduit is one of an electrical conduit or an optical conduit.

17. The system according to claim 13, wherein said downstream device is a full framer.

18. The system according to claim 13, wherein said inbound data stream is formatted in accordance with a protocol selected from the group consisting of: SONET, fibre channel and 10 Gigabit Ethernet.

* * * * *

UNITED STATES PATENT AND TRADEMARK OFFICE
CERTIFICATE OF CORRECTION

PATENT NO. : 8,160,109 B2  
APPLICATION NO. : 10/330416  
DATED : April 17, 2012  
INVENTOR(S) : Jay Proano et al.

It is certified that error appears in the above-identified patent and that said Letters Patent is hereby corrected as shown below:

ON THE TITLE PAGE:

Item (75) please correct the second applicant's name from Oiu" to "Qiu".

Signed and Sealed this
Seventh Day of August, 2012

David J. Kappos
*Director of the United States Patent and Trademark Office*